(12) United States Patent
Trinder

(10) Patent No.: US 12,331,635 B2
(45) Date of Patent: Jun. 17, 2025

(54) DOWNHOLE TRANSMITTER, SYSTEMS AND METHODS

(71) Applicant: Expro North Sea Limited, Aberdeen (GB)

(72) Inventor: Julian Richard Trinder, Southampton (GB)

(73) Assignee: EXPRO NORTH SEA LIMITED, Dyce (GB)

( * ) Notice: Subject to any disclaimer, the term of this patent is extended or adjusted under 35 U.S.C. 154(b) by 497 days.

(21) Appl. No.: 17/437,141

(22) PCT Filed: Feb. 24, 2020

(86) PCT No.: PCT/GB2020/050435
§ 371 (c)(1),
(2) Date: Sep. 8, 2021

(87) PCT Pub. No.: WO2020/183128
PCT Pub. Date: Sep. 17, 2020

(65) Prior Publication Data
US 2022/0145754 A1    May 12, 2022

(30) Foreign Application Priority Data
Mar. 8, 2019    (GB) .................................... 1903161

(51) Int. Cl.
*E21B 47/13*    (2012.01)
*H04L 25/49*    (2006.01)
*H04L 27/12*    (2006.01)

(52) U.S. Cl.
CPC .......... *E21B 47/13* (2020.05); *H04L 25/4902* (2013.01); *H04L 27/12* (2013.01)

(58) Field of Classification Search
None
See application file for complete search history.

(56) References Cited

U.S. PATENT DOCUMENTS

| | | | | |
|---|---|---|---|---|
| 3,930,220 A | * | 12/1975 | Shawhan | ................ E21B 47/16 367/2 |
| 4,328,567 A | * | 5/1982 | Dodge | .................... G01V 1/50 702/6 |
| 4,891,641 A | * | 1/1990 | Gard | ....................... E21B 47/12 340/854.9 |
| 6,070,060 A | | 5/2000 | Edelman | |

(Continued)

OTHER PUBLICATIONS

Oppenheim et al., Signals and Systems, Chapter 4.8 The Modulation Property, p. 219-222, 1982 (Year: 1982).*

*Primary Examiner* — Curtis A Kuntz
*Assistant Examiner* — Jerold B Murphy
(74) *Attorney, Agent, or Firm* — Getz Balich LLC

(57) ABSTRACT

A transmitter for use in downhole telemetry and/or control is provided. The transmitter includes a mixer; modulator; and signal generation apparatus configured to generate a frequency modulated signal. The mixer is configured to generate an output signal based on the frequency modulated signal. A frequency spectrum of the output signal includes upper and lower sidebands disposed about a suppressed or reduced frequency of the frequency modulated signal. The modulator is operable to modulate an input signal onto the output signal. A telemetry system and associated methods are also provided.

17 Claims, 5 Drawing Sheets

(56) References Cited

U.S. PATENT DOCUMENTS

| | | |
|---|---|---|
| 6,691,779 B1 | 2/2004 | Sezginer |
| 9,348,020 B2 * | 5/2016 | Wilson-Langman ........................ G01S 13/885 |
| 2012/0037354 A1 | 2/2012 | McCoy |
| 2013/0234879 A1 * | 9/2013 | Wilson-Langman ........................ G01S 13/885 342/21 |
| 2015/0015413 A1 | 1/2015 | Gao |
| 2016/0003034 A1 | 1/2016 | Liu |
| 2017/0204721 A1 * | 7/2017 | Babakhani .............. E21B 47/13 |
| 2018/0031414 A1 | 2/2018 | Farhadiroushan |
| 2018/0291729 A1 | 10/2018 | Wilson |

* cited by examiner

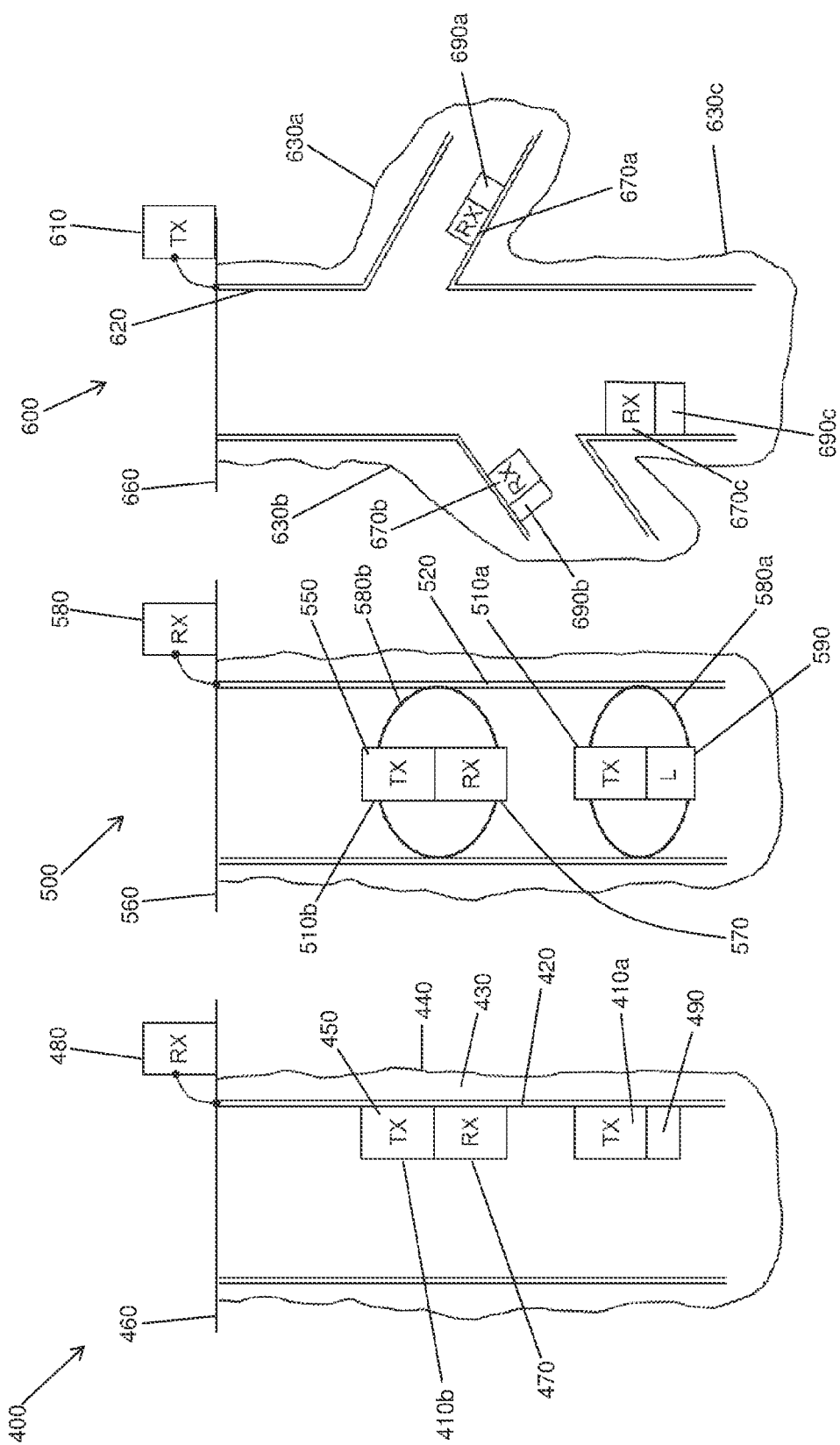

DOWNHOLE TRANSMITTER, SYSTEMS AND METHODS

This application claims priority to PCT Patent Appln. No. PCT/GB2020/050435 filed Feb. 24, 2020, which claims priority GB Patent Appln. No. 1903161.6 filed Mar. 8, 2019, which are herein incorporated by reference.

BACKGROUND OF THE INVENTION

1. Technical Field

Described examples relate to downhole communication systems, and in particular a transmitter apparatus and associated systems and methods for use for telemetry within flow lines or wells, such as oil and gas wells.

2. Background Information

Communication systems, and in particular telemetry systems may be deployed in oil or gas wells to measure and/or transmit or relay data for purposes of, for example, production monitoring, well integrity monitoring or communicating signals during a particular well operation (e.g. drill stem testing). Data transmitted by such telemetry systems may be observed at surface with appropriate receiver systems.

In some wells, the well structure itself or the environmental conditions may not be conducive to communication using conventional wired telemetry systems. For example, certain wells may comprise various tools and valves that are ill-suited to the presence of wired telemetry systems. Further, wired solutions typically require some form of planning for deployment at the time of completing the well and so retrofitting such solutions may be more complex than for example, a wireless hybrid solution.

As such, downhole telemetry systems may employ wireless data communication techniques as a means to transmit and receive data without incurring the costs, overheads and inconveniences associated with conventional wired systems.

Wireless downhole telemetry systems may employ techniques such as EM/RF communication, pressure/flow rate modulation of mud or the like, and/or acoustic transmission. In some examples, wireless communication may use multiple wireless techniques, and further sections of the signal path may be wired.

In some examples, it may be possible to employ acoustic telemetry in oil and gas wells using either the structure of the well itself or available production tubing or other continuous tubing in the well to transmit/receive signals. Limitations of acoustic telemetry include the need for regular repeaters due to attenuation, and limitations to data transfer rates and the reliability of received data.

This background serves only to set a scene to allow a skilled reader to better appreciate the following description. Therefore, none of the above discussion should necessarily be taken as an acknowledgement that that discussion is part of the state of the art or is common general knowledge. One or more aspects/embodiments of the invention may or may not address one or more of the background issues.

SUMMARY OF THE INVENTION

Aspects of the present disclosure are defined in the independent claims provided herewith. Some optional features are described in the dependent claims.

According to a first aspect of the present disclosure is a transmitter for use in downhole telemetry and/or control. The transmitter comprises: a mixer; modulator; and signal generation apparatus configured to generate a frequency modulated signal. The mixer is configured to generate an output signal based on the frequency modulated signal, a frequency spectrum of the output signal comprising upper and lower sidebands disposed about a suppressed or reduced level of the frequency modulated signal. The modulator is operable to modulate an input signal onto the output signal.

The transmitter may comprise an acoustic transducer configurable to provide an acoustic signal based on, or derived from, the output signal. The transducer may be adapted to be coupled to a well structure and/or the transducer is operable to propagate a signal via a well structure.

The transmitter may comprise an electromagnetic (e.g. RF) transducer configurable to provide an electromagnetic signal based on, or derived from, the output signal. The transmitter may comprise a plurality of mixers configured to generate the output signal based on one or more frequency modulated signals.

The signal generation apparatus may be configured to provide a sweep signal, such as a glide sweep or stepped sweep, to the mixer. The sweep signal may comprise a linear or exponential up-chirp and/or down-chirp signal. The signal generation apparatus may comprise a tuneable oscillator, which may be configured to provide a signal to the mixer. The signal generation apparatus may comprise a signal generator, which may be configured to provide a signal to the tuneable oscillator. The tuneable oscillator may be a Voltage Controlled Oscillator.

The mixer may be a double balanced mixer.

The modulator may be configurable to provide on-off keying. The modulator may be configurable to provide phase shift keying and/or binary phase shift keying and/or frequency shift keying and/or amplitude shift keying, which forms of modulation may be applied to the fixed-frequency oscillator.

The transmitter may comprise a fixed-frequency oscillator. The fixed frequency oscillator may be coupled to the mixer. The mixer may be configurable to suppress or reduce a frequency component corresponding to the fixed-frequency oscillator from the output signal.

The transmitter may comprise a driver circuit. The driver circuit may be configured to provide one or more signals based on the output signal to the transducer. An output of the driver may comprise a differential signal. An output of the driver may comprise a pulse-width modulation (PWM) signal.

The modulator may be operable to modulate at least one of: a signal provided by the signal generator; a supply or signal provided to the driver; a supply or signal provided to the fixed-frequency oscillator; a supply or enabling signal provided to the mixer; and a supply or signal provided to the transducer.

The transmitter may be configured to transmit data signals having a frequency of in the region of from 0.05 Hz to 100 kHz.

According to a second aspect of the present disclosure is a repeater for use in downhole telemetry and/or control. The repeater comprises the transmitter of the first aspect. The repeater further comprises a receiver. The repeater may be configured to transmit a received signal. The repeater may be adapted to transmit an electromagnetic signal and/or an acoustic signal. The repeater may be adapted to receive an acoustic signal and/or an electromagnetic signal.

According to a third aspect of the present disclosure is a telemetry system for use in wirelessly transmitting data downhole. The telemetry system comprises a transmitter of the first aspect. The transmitter may be configured to wirelessly transmit data signals, e.g. for propagation via a well structure.

The system may comprise a receiver configurable to receive the data signals. The system may comprise at least one repeater disposed on or within the well structure. The at least one repeater may be communicably coupled to the transmitter and/or a further repeater and/or the receiver. The repeater and/or the further repeater may be a repeater according to the second aspect.

The telemetry system may comprise at least a portion of the well structure, wherein the well structure may be a metallic structure.

According to a fourth aspect of the present disclosure is a production well or an abandoned well comprising the telemetry system of the third aspect.

According to a fifth aspect of the present disclosure is a method of transmitting data signals in a downhole telemetry and/or control system. The method comprises: using a mixer to generate an output signal comprising upper and lower sidebands disposed about a suppressed or reduced frequency modulated signal; and modulating an input signal onto the output signal.

The method may further comprise the step of providing the output signal to an acoustic transducer, the acoustic transducer being coupled to a well structure.

According to a sixth aspect of the present disclosure is a method for monitoring a well. The method comprises collecting data associated with the well, the collected data being derived from data signals having been transmitted via a metallic well structure of the well using a transmitter of the first aspect.

In some examples, there is described a computer program product that when programmed into a suitable controller configures the controller to perform any methods disclosed herein. There may be provided a carrier medium, such as a physical or tangible and/or non-transient carrier medium, comprising the computer program product. The carrier medium may be a computer readable carrier medium.

The invention includes one or more corresponding aspects, embodiments or features in isolation or in various combinations whether or not specifically stated (including claimed) in that combination or in isolation. As will be appreciated, features associated with particular recited embodiments relating to systems may be equally appropriate as features of embodiments relating specifically to methods of operation or use, and vice versa.

It will be appreciated that one or more embodiments/aspects may be effective in providing downhole communication, and in particular acoustic communications (e.g. for the purpose of telemetry methods and systems control). The above summary is intended to be merely exemplary and non-limiting.

BRIEF DESCRIPTION OF THE DRAWINGS

A description is now given, by way of example only, with reference to the accompanying drawings, in which:—

FIG. 5A is an example use case of a transmitter fixed in a well according to an example, for downhole telemetry;

FIG. 5B is a further example use case of a transmitter deployed in a well for downhole telemetry; and FIG. 5C is a further example use case of a transmitter deployed for downhole telemetry in a subsea multilateral well.

DETAILED DESCRIPTION OF THE INVENTION

For ease of explanation, the following examples have been described in relation to an oil and gas well, and in particular a well structure extending below the surface, or the like. However, systems and methods described herein may be equally used and applicable in respect of flow lines associated with oil and gas production, or indeed injection wells, etc. As such, while the following examples may be described in relation to oil and gas wells, and in particular production and appraisal wells, the same systems and methods, etc., may be used beyond oil and gas applications. A skilled artificer will be able to implement those various alternative embodiments accordingly.

Generally, disclosed herein are apparatuses, systems and methods for communicating data signals from downhole to at least one receiver at a ground region near the well, or vice versa. In particular, apparatuses, methods and systems disclosed are arranged to communicate data signals from a well having an essentially continuous well structure or well structure signal path (e.g. either the casing of the well, or tubing components positioned within the well), wherein the well structure may be used as a medium to propagate the data signals from downhole to the receivers at the surface, or vice versa. It is noted that the well structure need only be suitable for propagating signals, such as acoustic and/or electromagnetic signals.

Figure 1A:
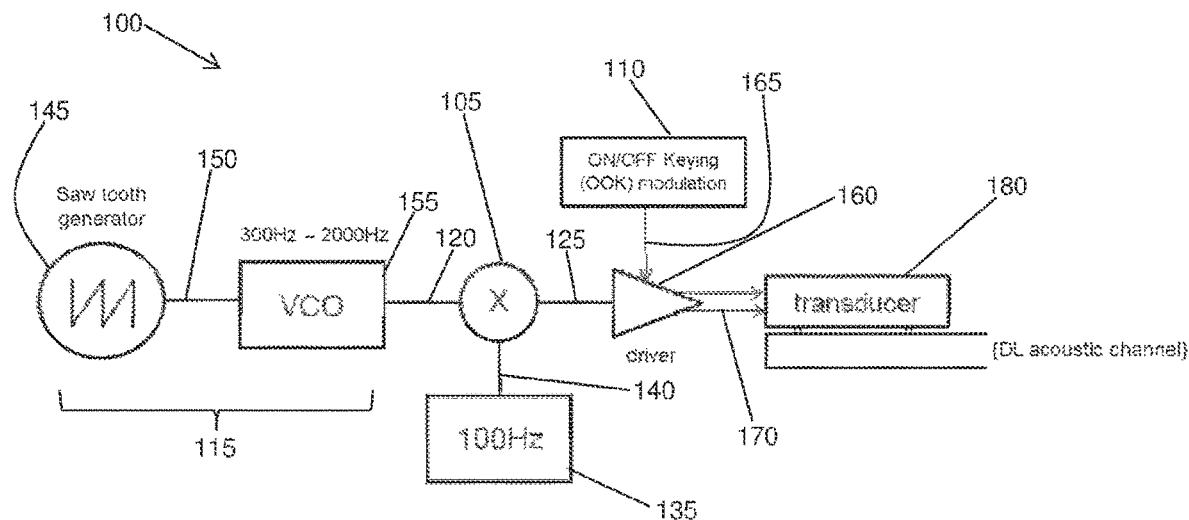
FIG. 1A is a block diagram of a transmitter.

Referring now to FIG. 1A, there is shown a block diagram of a transmitter, generally denoted 100, according to an example. In this example, the transmitter 100 comprises a mixer 105, a modulator 110 for providing on-off keying (OOK) and a signal generation apparatus 115.

Figure 3:
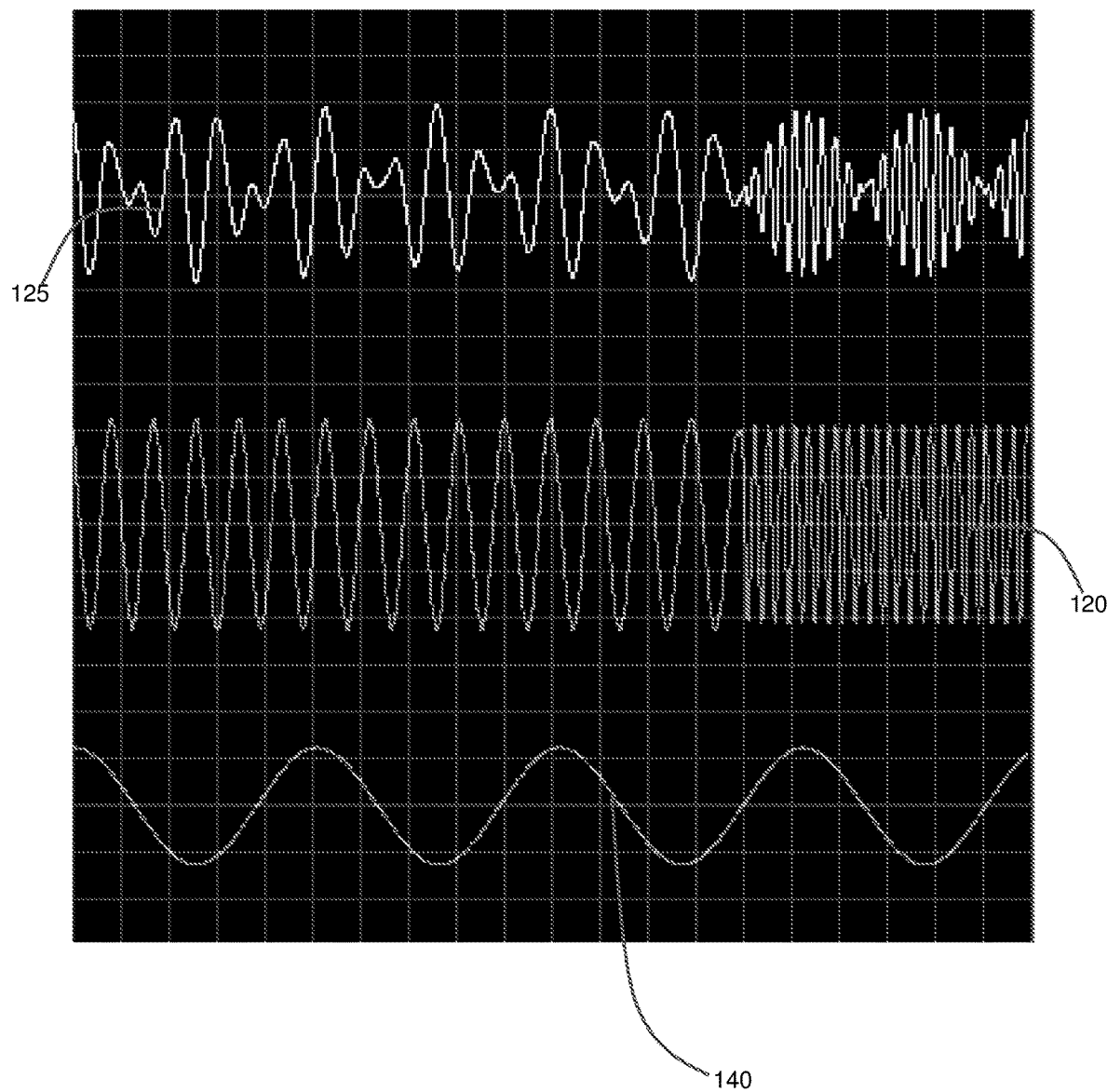
FIG. 3 is a representation of an example waveform generated by the tuneable oscillator, an example waveform generated by the fixed frequency oscillator and output from the mixer of the systems of FIGS. 1A and 1B.

An oscillator, such as a fixed frequency oscillator 135 may be coupled to the mixer 105. That is, the fixed frequency oscillator 135 provides a signal 140 to the mixer 105, the signal comprising a frequency component at a fixed frequency. An example of the signal 140 provided by the fixed frequency oscillator 135 is shown in FIG. 3.

The mixer 105 is balanced with respect to both its inputs (i.e. double-balanced). The mixer 105 is configured to generate an output signal 125 derived from a frequency modulated signal 120. A frequency spectrum of the output signal 125 of the mixer 105 comprises upper and lower sidebands disposed about a suppressed or reduced frequency modulated signal 120, as will be described in more detail with reference to FIG. 4. In particular, the output from the mixer 105 is a dual-tone chirp signal 125, an example of which is shown in FIG. 3.

The mixer 105 in this example is a double balanced mixer. As such, the mixer 105 suppresses or reduces frequency components on the output signal 125 of the mixer 105 of both input signals 120, 140 to the mixer 105.

Advantageously, by suppressing the frequency components of both input signals 120, 140 to the mixer 105 on the output signal 125 from the mixer 105, the power of the output signal 125 may be completely, or predominantly, confined to sidebands i.e. frequencies of interest, and not in a carrier signal, i.e. not at a frequency of the fixed frequency oscillator 135 or the signal generation apparatus 115.

The signal generation apparatus 115 comprises a signal generator 145. In the example embodiment shown, the signal generator 145 is configured to generate a saw-tooth waveform signal 150. It will be appreciated that the signal generator 145 may be capable of generating other waveforms. The signal generator 145 may be a general purpose signal generator or an otherwise configurable signal or function generator, or may be a dedicated circuit for specifically generating the saw-tooth waveform signal 150 of interest.

As can be seen from FIG. 1A, the saw-tooth waveform signal 150 generated by the signal generator 145 comprises an upward saw-tooth waveform i.e. the signal periodically ramps upwards from a low-voltage to a high-voltage before sharply dropping to the low-voltage. In other embodiments falling within the scope of the invention, the saw-tooth waveform signal 150 may be a downward saw-tooth waveform signal (e.g. a signal comprising an inverse saw-tooth waveform).

In this example, the signal generation apparatus 115 comprises a tuneable oscillator 155. Here, the signal generator 145 and the tuneable oscillator 155 are operable to generate the input signal 120 to the mixer 105, as described below.

The tuneable oscillator 155 is a voltage controlled oscillator. The saw-tooth waveform signal 150 is input to the tuneable oscillator 155. An output 120 from the tuneable oscillator 155, i.e. the frequency modulated signal 120, is an input to the mixer 105. The frequency modulated signal 120 has a frequency component that is proportional to a voltage of the saw-tooth waveform signal 150. As such, the tuneable oscillator 155 is configured to generate a signal 120 with a frequency component that periodically linearly increases in frequency from a low frequency to a high frequency. That is, the tuneable oscillator 155 is configured to generate an upwards chirp signal 120.

In the example embodiment described above, an upward chirp signal 120, and in particular a linear upward chirp signal, is generated. It will be appreciated that a downward saw-tooth waveform signal generated by the signal generator 145 would generate a downward chirp signal. An example of a downward chirp signal 120 that could be provided by the tuneable oscillator 155 is shown in FIG. 3. Furthermore, other chirp signals, such as exponential chirp signals may be generated by means of configuring the signal generator 145 to generate alternative waveforms such as, for example, exponential saw-tooth waveform signals. In yet further examples, a function generator may directly provide a chirp signal to the mixer 105, i.e. without need for a discrete VCO.

The output signal 125 from the mixer 105 is an input to a driver 160. The driver 160 provides an output signal 170 to a transducer 180. The driver 160 may be capable of providing a higher current output than the mixer 105. The driver 180 may boost the voltage of the signal from the mixer 105. In the example embodiment shown, the driver 160 is a differential driver, e.g. the driver 160 provides a differential signal 170. However, it will be appreciated that the type and rating of the driver 160 may be adapted or selected to suit the transducer 180 to which the driver is providing a signal 170, and/or to suit the input signal 125 (voltage and/or drive strength) provided to it from the mixer 105. For example, in other examples, the driver 160 may provide a single output (i.e. non-differential output). Similarly, the driver 160 may be or may comprise a solid-state driver and/or a pulse-width modulation (PWM) driver, and/or discrete components and circuitry. In examples, the driver 160 may comprise a plurality of drivers, arranged as a multi-stage driver circuit. In an example embodiment, the portion of circuitry of the transmitter comprising the mixer 105 may be rated at, for example, +/−5V and <1 A, whereas signals 170 provided to the transducer 180 may be up to 1 kV, or currents exceeding 10 A. Furthermore, drive circuitry, such as some or all of driver 160 may be a component of, or generally formed as part of, the transducer 180.

Here, the transducer 180 is an acoustic transducer, which in FIG. 1 is shown coupled to the well structure and labelled as DL acoustic channel, i.e. Down Link. It will however be appreciated that the transducer may also serve in an UL acoustic channel, i.e. Up Link. In a preferred embodiment, the transducer 180 is a piezoelectric transducer, such as a PZT transducer or the like. In use, the transducer 180 may be coupled to a component of a downhole well, such as a drill string, a tool, casing, or other tubular or liner, as will be described below.

The transmitter 100 comprises a modulator 110. In the example embodiment shown the modulator 110 provides a modulation signal 165 to the driver 160. The modulation signal 165 modulates data to be transmitted by the transmitter 100 onto a signal 170 output by the driver 160. In one embodiment, the modulator 110 is configurable to provide on-off keying and/or amplitude shift keying (ASK) based on the data. However, in other examples, the modulator may be configurable to provide phase shift keying and/or binary phase shift keying and/or frequency shift keying to the "fixed-frequency" oscillator 135.

The modulator 110 may be implemented at various stages of the circuitry of the transmitter 100. For example, turning now to FIG. 1B, there is shown a transmitter 200 which corresponds to an alternative example. The transmitter 200 comprises generally the same features as the transmitter 100 of FIG. 1A, and is annotated by references incremented by 100 relative to the references of FIG. 1A, i.e. mixer 205, tuneable oscillator 255, signal generator 245, fixed frequency oscillator 235, modulator 210 and transducer 280.

Figure 1B:
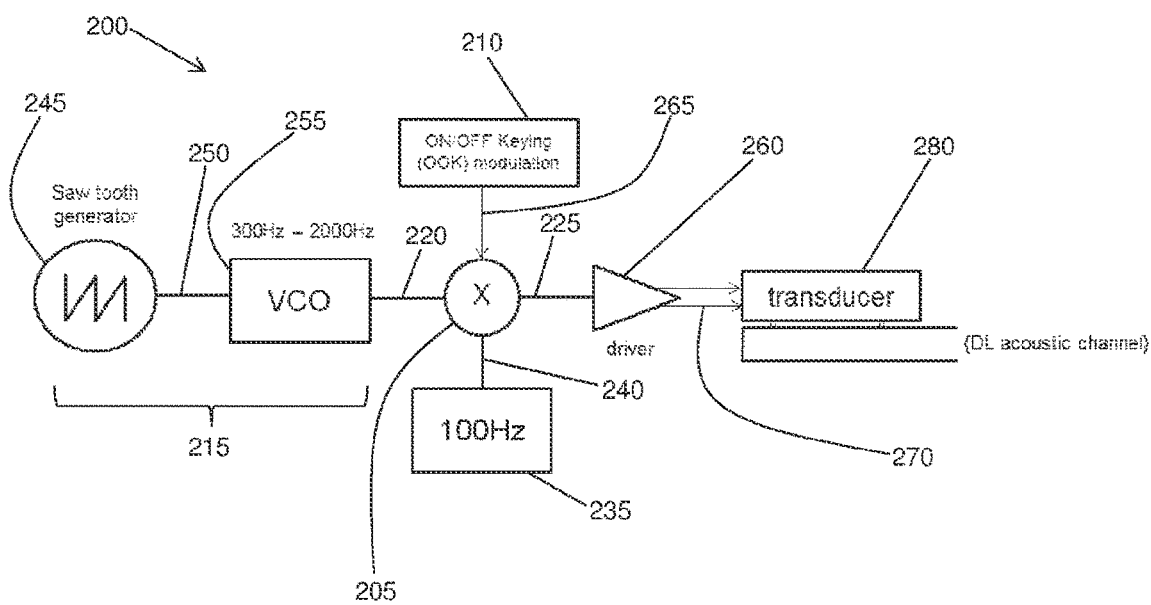
FIG. 1B is a block diagram of a transmitter according to a further example.

As shown in FIG. 1B, modulation is applied by the modulator 210 directly to the mixer 205. That is, the modulator 210 may, for example, modulate a power supply (not shown) to the mixer 205, or to a portion of circuitry comprising the mixer 205. Alternatively the modulator 210 may modulate signals 220, 240, 225 provided to or from the mixer 205. Alternatively the modulator 210 may modulate power supplies to, or signals to or from, one or more components of the transmitter 200, for example the signal generator 245, the driver 260 or the transducer 280.

Figure 2:
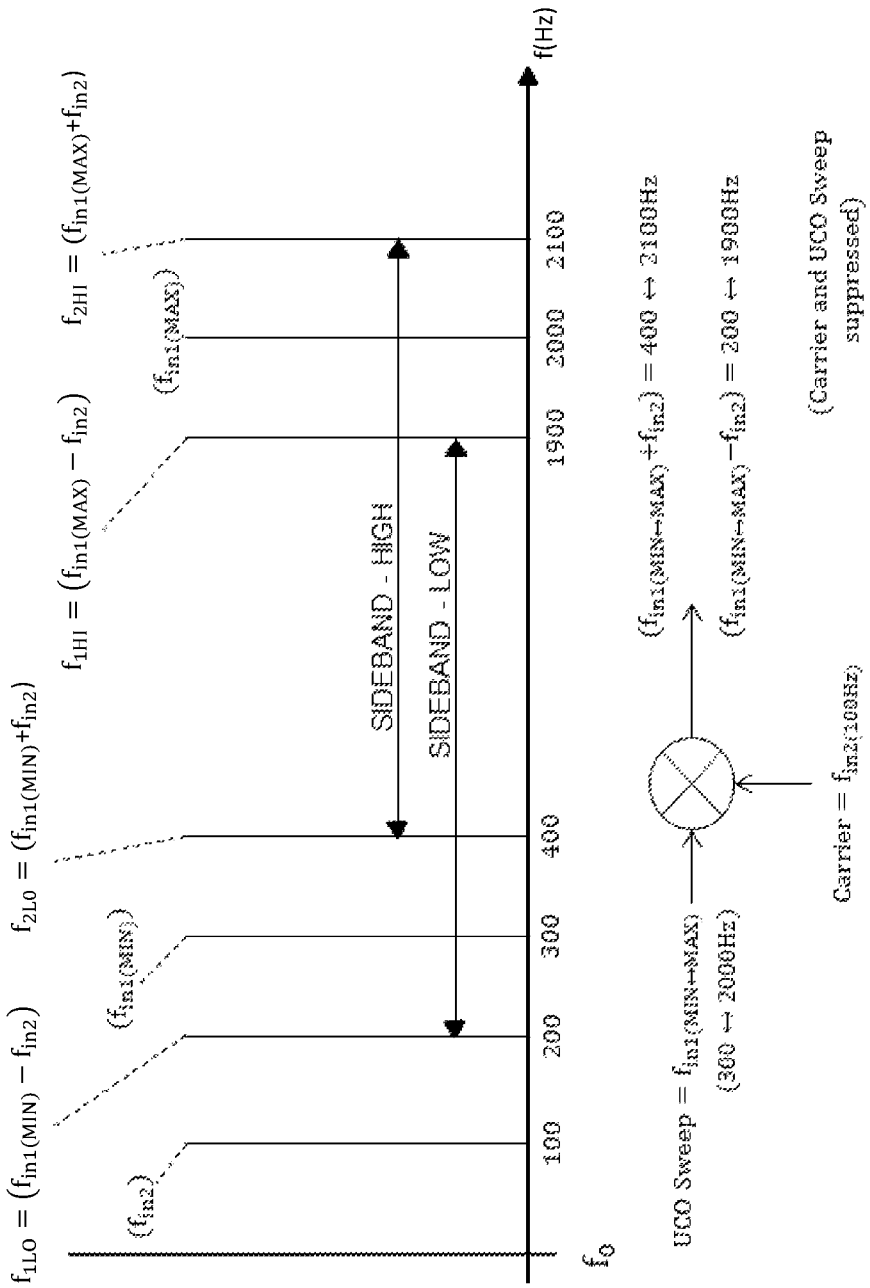
FIG. 2 is a frequency spectrum representing an example use case.

Referring now to FIG. 2, there is shown a frequency spectrum of an example use case, and in particular a use case downhole. Specific frequencies shown are for example purposes only, and it will be understood that in practical implementation of this example, signals comprising other frequencies may be used. In particular, although frequencies shown in FIG. 2 are in the range of 100 Hz to 2100 Hz, lower frequencies such as 0.5 Hz, and higher frequencies, such as 20 kHz or ultrasonic frequencies, may be used, depending on specific application—as will be appreciated.

In the example shown in FIG. 2, the frequency of the signal, i.e. signal 120, 220, provided by the signal generation apparatus 115, 215 ranges from 300 Hz to 2 kHz. The signal when at 300 Hz is denoted $f_{in1MIN}$ and the signal when at 2 kHz is denoted $f_{in1MAX}$.

Furthermore, in the example shown in FIG. 2, the fixed frequency signal, e.g. the signal 140, 240 provided by the fixed frequency oscillator 135, 235 as shown in FIGS. 1A and 1B, is 100 Hz, and is denoted $f_{in2}$.

In one embodiment, the mixer 105, 205 is a double balanced mixer. As such, in the output signal 125, 225 from the mixer 105, 205, frequency components corresponding to the fixed frequency signal 140, 240 and the signal 120, 220 provided by the signal generation apparatus are suppressed or reduced.

The mixer provides an output signal 125, 225 comprising a lower frequency component fi with a frequency corresponding to the difference between the frequency components of the frequencies of the input signals 120, 140, 220, 240. That is, the output signal from the mixer comprises a lower frequency component with a frequency that ranges from $f_{in1MIN}-f_{in2}$ to $f_{in1MAX}-f_{in2}$. As shown in FIG. 2, this lower frequency component T ranges from $F_{1LO}$ to $F_{1HI}$ and is denoted "SIDEBAND_LOW".

The output signal 125, 225 of the mixer also comprises an upper frequency component $f_2$ with a frequency corresponding to the sum of the frequency components of the frequencies of the input signals 120, 140, 220, 240. That is, the output signal from the mixer comprises frequency components with a frequency that ranges from $f_{in1MIN}+f_{in2}$ to $f_{in1MAX}+f_{in2}$. As shown in FIG. 2, this upper frequency component $f_2$ ranges from $F_{2LO}$ to $f_{2HI}$ and is denoted "SIDEBAND_HIGH".

In an example embodiment, the fixed frequency oscillator 135, 235 may provide a 100 Hz signal 140, 240 to the mixer 105, 205. The signal generation apparatus 115, 215 may provide a linear upwards chirp signal 120, 220 to the mixer 105, 205, wherein the frequency of the signal 120, 220 periodically linearly increases from 300 Hz to 2 kHz. As such, an output signal 125, 225 from the mixer 105, 205 comprises a lower frequency component that ranges from 200 Hz to 1900 Hz, termed the SIDEBAND_LOW, and a higher frequency component that ranges from 400 Hz to 2100 Hz, termed SIDEBAND_HIGH. As previously described, in other embodiments alternative frequencies and waveforms may be provided to the mixer 105, 205.

Examples of the waveforms described herein are shown in FIG. 3, which shows the fixed frequency waveform 140, 240 output by the fixed frequency oscillator 135, 235, the sawtooth driven chirp waveform 120 (in this case a descending chirp waveform) output from the tuneable oscillator 155, 255 (the shown portion being at the transition between the end of one chirp and the start of the next chirp), and the dual-tone spread spectrum chirp 125, 225 output by the mixer 105, 205.

Figure 4:
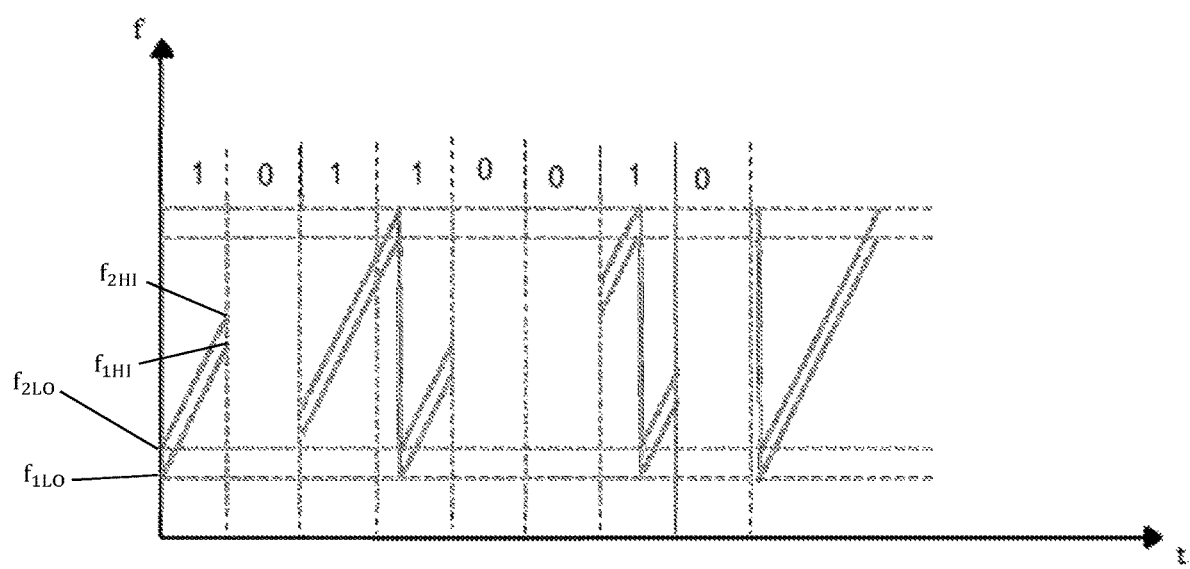
FIG. 4 is a representation of On-Off Keying Modulation of a Chirp Spread Spectrum signal.

Referring now to FIG. 4, there is shown an example of data modulated onto an output signal 170 output by the driver 160. The signal 170, 270 in this example is an upwards chirp signal generated as described with reference to FIG. 1. The signal 170, 270 comprises upper and lower main frequency components, generated as described with reference to FIG. 2. In the example shown in FIG. 4, On-Off Keying (OOK) is used to modulate a binary string of data, shown as "10110010", onto the signal 170, 270.

The upwards chirp signal of FIG. 4 comprises two main frequency components, T and Ï2, which corresponds to SIDEBAND_LOW and SIDEBAND_HIGH respectively. SIDEBAND_LOW increases in frequency linearly from $f_{1LO}$ to $f_{1HI}$. Similarly, SIDEBAND_HIGH increases in frequency linearly from $f_{2LO}$ to $f_{2HI}$. As such, each chirp comprises two frequency components i.e. 'a dual-tone' chirp.

A binary "1" is indicated by the presence of the signals, i.e. at least part of the upwards chirp signals as described above, and as shown FIG. 4. A binary "0" is provided by the absence of signals. This exemplifies On-Off keying. In this manner, a binary string or sequence may be transmitted by the transmitter 100, 200.

Advantageously, the provision of dual-tone chirp signal provides a robust and reliable data transmission means for downhole communication. In particular, detrimental characteristics that may otherwise be associated with Chirp Spread Spectrum (CSS) communication, such as channel fades, multipath propagation, periodic transmission passbands, jamming signals and the like may be overcome, or sufficiently mitigated by using dual-tone chirp signals in accordance with the disclosed invention.

FIGS. 5A to 5C show examples of use cases of the devices and methods. FIG. 5A shows a telemetry system deployed in a well, and generally denoted 400. The system 400 comprises a transmitter 410a according to any of the abovementioned examples. The transmitter 410a is coupled to a tubular 420 or otherwise form of well structure.

The transmitter is also coupled to a measurement or downhole tool 490, for measuring or logging data for transmission by the transmitter 410a. It will be appreciated that the examples provides are for illustration, and that the transmitter may be coupled to or form part of a communication system provided with a tools string, or the like, and equally with specific well structure like casing, or indeed be provided to communicate along a signal path comprising tubing, well structure, gauges, etc.

In the embodiment shown in FIG. 5a, the tubular 420 is the casing string, which is cemented into the well 440 using cement 430. The reader will appreciate that the transmitter 410a for use in downhole telemetry and/or control may be affixed to other tubulars or tools, such as production tubing, or other string in the well, e.g. drill string, or the like.

The transmitter 410a comprises a transducer (not shown), as exemplified in FIGS. 1A and 1B. The transducer of the transmitter 410a is coupled to the casing 420, and is thus operable to transmit acoustic signals via the casing 420.

Due to attenuation of the acoustic signal as it propagates along the casing 420 towards surface 460, it may in some situations be necessary to employ one or more repeaters 450. In one embodiment, such a repeater 450 comprises a receiver 470 adapted to receive the acoustic signal transmitted by the transmitter 410a. Furthermore, such a repeater 450 also comprises a transmitter 410b, wherein the transmitter is a transmitter according to any of the abovementioned embodiments of the invention.

In the example shown in FIG. 5A, a single repeater 450 is employed. It will be appreciated that, dependent upon one or more factors which may include the distance between transmitter 410a and receiver 480 at surface 460, and the nature of any medium within the casing and/or the nature of a surrounding formation, more than one repeater 450 may be required. Furthermore, the number of repeaters 450 required may depend upon a frequency and amplitude of a transmitted signal, and a general attenuation of the acoustic signal within the well.

Advantageously, by transmitting data using dual-tone chirp spread spectrum communication, according to the disclosed examples, the signal may be more reliably received, and may be less prone to the effects of channel fades, multipath propagation, periodic transmission passbands, jamming signals and the like. As such, dual-tone chirp spread spectrum communications may permit the use of fewer repeaters than may otherwise be required when using conventional downhole acoustic telemetry systems.

FIG. 5B is a simple schematic diagram of a further example of a telemetry system deployed in a well, and is generally denoted 500. The system 500 comprises a transmitter 510a according to any of the abovementioned examples. The transmitter 510a is coupled to a tubular 520. However, in contrast to FIG. 5a, the transmitter 510a is deployed in the well using a tool, and may therefore be moved to different positions within the well. That is, the transmitter 510a is not installed on a wall of the casing 520 or other tubular. The transmitter 510a (or at least the transducer of the transmitter 510a) may be brought into contact with the casing 520 using, for example, arms of a centralizer 580. As such, the transmitter 510a is operable to transmit acoustic signals, such as dual-tone chirp signals according to the present examples, via the structure of the casing 520. Different types of tool or centralizer 580, such as a bow spring, rigid, semi-rigid or mold-on centralizer, could be used, and each may have differing signal transfer properties. However, a skilled worker in the field could, based on the present disclosure, select a suitable tool, e.g. centralizer, for the specific situation in which the system is to be used to achieve acceptable signal transfer.

Again, for purposes of example only, a single repeater 550 is employed to relay the transmitted signal to a receiver 580 at surface 560.

The repeater 550 comprises a receiver 570 adapted to receive the acoustic signal transmitted by the transmitter 510a. Furthermore, the repeater 550 also provides a means for the transmitter 510b to couple to the metallic structure of the casing 520, such as via arms of a centralizer 580b, thus enabling the receiver 570 to receive signals and the transmitter 510b to transmit signals via the casing 520.

Turning now to FIG. 5C, there is shown an example of a control system deployed in a multilateral producing well, generally denoted 600. The well comprises two branches 630a, 630b, extending from the primary well 630c. Each of the branches 630a, 630b and the main well 630c comprises a corresponding receiver 670a, 670b, 670c. Each receiver 670a, 670b, 670c is coupled to a corresponding tool 690a, 690b, 690c. As such, data received by each receiver 670a, 670b, 670c may be used to actuate the corresponding tool 690a, 690b, 690c.

A transmitter 610 according to any of the abovementioned examples is located at surface 660. The transmitter 610 is coupled to the structure of the casing 620 of the well. As such, the transmitter 610 is operable to transmit data to the receiver 670a, 670b, 670c via the well structure, using dual-tone chirp signals as described above. As described with reference to FIGS. 5A and 5B, one or more repeaters (not shown) may also be employed to compensate for attenuation of the transmitted signal as it propagates down the well.

Thus, the transmitter 610 at surface 660 may be used to control one or more tools 690a, 690b, 690c downhole by means of data transmitted to receivers 670a, 670b, 670c associated with the downhole tools 690a, 690b, 690c via the structure of the casing 620 of the well. For example, such tools 690a, 690b, 690c may be valves, which may be operable to restrict a flow of production fluids to surface 660.

It will be appreciated that the above described examples may be used in combination with other communication means, such as using electromagnetic (EM) signals in the well, communicated along a metallic well structure (again, strings or sections of well infrastructure itself). As such, in some examples, the transmitter may form part of a hybrid communication systems, as will be appreciated by a skilled reader.

The applicant discloses in isolation each individual feature described herein and any combination of two or more such features, to the extent that such features or combinations are capable of being carried out based on the specification as a whole in the light of the common general knowledge of a person skilled in the art, irrespective of whether such features or combinations of features solve any problems disclosed herein, and without limitation to the scope of the claims. The applicant indicates that aspects of the invention may consist of any such individual feature or combination of features. In view of the foregoing description it will be evident to a person skilled in the art that various modifications may be made within the scope of the invention.

The invention claimed is:

1. A transmitter for use in downhole telemetry and/or control, the transmitter comprising:
   a mixer;
   a modulator;
   a fixed-frequency oscillator, the fixed frequency oscillator being coupled to the mixer; and
   a signal generation apparatus configured to generate a frequency modulated signal;
   wherein the mixer is configured to generate an output signal based on the frequency modulated signal, wherein the output signal comprises a dual-tone spread spectrum chirp and has a frequency spectrum and the frequency spectrum of the output signal includes an upper sideband and a lower sideband, wherein the upper sideband and the lower sideband are disposed about a suppressed or reduced frequency of the frequency modulated signal;
   wherein the mixer is configured to suppress or reduce a frequency component corresponding to the fixed-frequency oscillator from the output signal;
   wherein the modulator is operable to modulate an input signal onto the output signal;
   wherein the mixer is a double balanced mixer.

2. The transmitter according to claim 1, wherein the transmitter comprises an acoustic transducer configurable to provide an acoustic signal based on, or derived from, the output signal.

3. The transmitter according to claim 2, wherein the transducer is adapted to be coupled to a well structure and/or the transducer is operable to propagate a signal via a well structure.

4. The transmitter according to claim 1, wherein the transmitter comprises an electromagnetic transducer configurable to provide an electromagnetic signal based on, or derived from, the output signal.

5. The transmitter according to claim 1, wherein the modulator is operable to modulate at least one of:
   a signal provided by the signal generator;
   a supply or signal provided to the driver;
   a supply or signal provided to the fixed-frequency oscillator;
   a supply or enabling signal provided to the mixer; and
   a supply or signal provided to the transducer.

6. The transmitter according to claim 1, wherein the signal generation apparatus is configured to provide a sweep signal, such as a glide sweep or stepped sweep, to the mixer.

7. The transmitter according to claim 6, wherein the sweep signal comprises a linear or exponential up-chirp and/or down-chirp signal.

8. The transmitter according to claim 1, wherein the signal generation apparatus comprises:
   a tuneable oscillator configured to provide a signal to the mixer; and
   a signal generator configured to provide a signal to the tuneable oscillator.

9. The transmitter according to claim 8, wherein the tuneable oscillator is a Voltage Controlled Oscillator.

10. The transmitter according to claim 1 comprising a driver circuit, the driver circuit configured to provide one or more signals based on the output signal to the transducer, and optionally wherein:
   an output of the driver comprises a differential signal; and
   an output of the driver comprises a pulse-width modulation (PWM) signal.

11. The transmitter according to claim 1, wherein the modulator is configurable to provide on-off keying and/or amplitude shift keying to the transducer driver and/or to the mixer.

12. The transmitter according to claim 1, wherein the modulator is configurable to provide phase shift keying and/or binary phase shift keying and/or frequency shift keying to the fixed-frequency oscillator, based on the input signal.

13. A repeater for use in downhole telemetry and/or control comprising the transmitter of claim 1 and a receiver, the repeater being configured to transmit a received signal.

14. A telemetry system for use in wirelessly transmitting data downhole, the system comprising a transmitter according to claim 1, wherein the transmitter is configured to wirelessly transmit data signals for propagation via a well structure.

15. The telemetry system according to claim 14 comprising at least a portion of the well structure, wherein the well structure is a metallic structure.

16. A method of transmitting data signals in a downhole telemetry and/or control system, the method comprising:
   using a mixer to generate an output signal comprising a dual-tone spread spectrum chirp and upper and lower sidebands equally disposed about a suppressed or reduced frequency modulated signal;
   modulating an input signal onto the output signal;
   using the mixer to suppress or reduce a frequency component corresponding to a fixed-frequency oscillator coupled to the mixer from the output signal; and
   wherein the mixer is a double balanced mixer.

17. The method according to claim 16, further comprising the step of providing the output signal to an acoustic transducer, the acoustic transducer being acoustically coupled to a well structure.

* * * * *